United States Patent [19]

Krampitz et al.

[11] Patent Number: 5,323,651
[45] Date of Patent: Jun. 28, 1994

[54] OVAL GEAR FLOWMETER FOR SMALL NOMINAL DIAMETERS

[75] Inventors: Herbert Krampitz, Potsdam; Ulrich Heyn, Teltow, both of Fed. Rep. of Germany

[73] Assignee: Daniel Industries, Inc., Houston, Tex.

[21] Appl. No.: 893,106

[22] Filed: Jun. 3, 1992

[30] Foreign Application Priority Data

Jun. 4, 1991 [DE] Fed. Rep. of Germany ....... 4119236

[51] Int. Cl.⁵ ................................................ G01F 3/10
[52] U.S. Cl. ................................................ 73/261
[58] Field of Search .................. 73/261, 253, 272; 418/182, 206

[56] References Cited

U.S. PATENT DOCUMENTS

| | | | |
|---|---|---|---|
| 4,770,617 | 9/1988 | Hertell | 418/206 |
| 4,901,567 | 2/1990 | Bertke et al. | 73/272 |
| 5,027,653 | 7/1991 | Foran | 73/253 |
| 5,174,738 | 12/1992 | Baumann et al. | 418/182 |

*Primary Examiner*—Richard E. Chilcot, Jr.
*Assistant Examiner*—Harshad Patel
*Attorney, Agent, or Firm*—Alton W. Payne; David M. O'Brian

[57] ABSTRACT

The present invention relates to a small nominal diameter oval gear flowmeter having curved swivel surfaces for automatic self-alignment of the oval gears about a longitudinal shaft axis to enhance measurement accuracy and facilitate restriction-free rotational movement of the oval gears by reducing gaps in the seal surfaces to prevent contact between the oval gears and the axial measuring chamber wall. Two or more oval gears are each supported on independent shafts which in turn are supported in the measuring insert of the housing. The oval gears are supported on the shafts in such a manner that they may swivel at a small angle about the longitudinal shaft axis and that small axial displacements of the oval gears may be accommodated on the shafts. A plurality of recesses that reduce the support length to approximately the shaft diameter are located on both sides of the frontal surfaces of the oval gears, to provide for automatic alignment of the oval gears. In accordance with an alternate embodiment, curved surfaces are provided either on the shafts disposed through the longitudinal bore of one or more oval gears or on the surface of the longitudinal bore of one or more oval gears, thus allowing a small swiveling action about the longitudinal axis of one or more shafts.

6 Claims, 1 Drawing Sheet

OVAL GEAR FLOWMETER FOR SMALL NOMINAL DIAMETERS

FIELD OF THE INVENTION

The present invention relates generally to an apparatus for quantitative volume measurements. Specifically, the present invention relates to a small nominal diameter oval gear flowmeter for automatic self-alignment of the oval gears about a longitudinal shaft axis to enhance measurement accuracy and facilitate restriction-free rotational movement of the oval gears.

BACKGROUND OF THE INVENTION

Obtaining accurate flow measurements from a small nominal diameter oval gear flowmeter is important if such instruments are to be used in industry. In oval gear flowmeters, the oval gears permit a known volume of fluid to flow through a fluid path in a measuring chamber for determining the volume or rate of the flowing fluid. As fluid flows through the measuring chamber, the oval gears rotate due to the minimal differential pressure created in the measuring chamber. The rotation of the oval gears form movable separation walls that prevent a direct through flow of fluid through the measuring chamber. The oval gears however, allow the through flow of a known quantity of fluid to pass through the measuring chamber as said oval gears rotate. The oval gears are engaged to shafts which contact various display devices for enumerating the flow rate.

Precision of the flowmeter is strongly dependent on minimizing seepage at the seal surfaces. Seal surfaces involved include surfaces of the gears and housing in both the radial and axial directions. Tight seals must be maintained between the gear and the housing to prevent flow from bypassing the measuring chamber. This is particularly true for small sized flowmeters which have small diameter oval gears, i.e. smaller than 20 mm. Obviously, for smaller sized flowmeters, seepage can account for a greater percentage of the total flow in comparison to large devices. However, tighter seals involving closer machined tolerances and smaller gaps can increase friction, produce excessive differential pressure across the flowmeter and misalignment in the chamber. This can result in jamming and oval gear rotation difficulties.

A primary problem in obtaining accurate flow measurements from oval gear flowmeters is minimizing the axial gaps and the radial gaps between the oval gears and the measuring chamber walls. Another problem in obtaining accurate flow measurements from oval gear flowmeters is minimizing the differential pressure in the measuring chamber. Oval gear flowmeters with small nominal diameters require a high manufacturing-technical standard to guarantee small gaps and easy rotation of the oval gears. Oval gears of small nominal diameters, i.e., smaller than 20 mm, have a much greater effect on the flow measurement accuracy as compared to oval gears of larger nominal diameters. When the gaps between the frontal surfaces of the oval gears and the opposite axial measuring chamber walls are made smaller, even slight misalignments between the oval gears and the axial measuring chamber walls will be noticed. Misalignment that leads to a deviation in the parallel arrangement between the frontal surfaces of the oval gears and the corresponding axial measuring chamber walls, may result in a contact between the oval gears and the measuring chamber wall, causing an interruption in the rotation of the oval gears.

Many problems are associated with prior known oval gear flowmeters. Difficulties arise when the oval gears are rigidly supported in housings on fixed spindles which are not self aligning. Contact between the oval gears and the measuring chamber walls is an existing problem. Another common problem of the prior known oval gear flowmeters is the tendency for the axial position, as well as the angular position of the oval gears to change easily.

There is, therefore, a need for an oval gear flowmeter that avoids the problems of the prior known flowmeters.

A feature of the present invention is to provide an oval gear flowmeter where the oval gear frontal surfaces are parallel and align themselves automatically on the parallel inside surfaces of the measuring chamber.

Another feature of the present invention is to provide an oval gear flowmeter where the oval gears are connected to a shaft by a locking pin placed traversely through an opening in the shaft, wherein the opening in the shaft is aligned with a groove in the top surface of the oval gears.

Yet another feature of the present invention is to provide an oval gear flowmeter where the oval gears are supported in the measuring chamber such that alignment errors in the shaft support may be equalized without increasing the axial gap.

Yet still another feature of the present invention is to provide an oval gear flowmeter for small nominal diameters that has small gaps between the gears and the measuring chamber wall.

Another feature of the present invention is to provide an oval gear flowmeter where the oval gears turn without restriction when engaged with fluid.

Still another feature of the present invention is to provide an oval gear flowmeter that prevents restrictive contact between the oval gear and the measuring chamber wall by means of an automatic aligning of the oval gears.

SUMMARY OF THE INVENTION

To achieve the foregoing objects, features and advantages and in accordance with the purpose of the present invention as embodied and broadly described herein, a small nominal diameter self aligning oval gear flowmeter is provided for measuring the volumetric flow of fluids. The small nominal diameter oval gear flowmeter comprises a measuring chamber disk having a central cavity defined by a radial wall, wherein fluid flows through said cavity; at least two oval gears having a concentric longitudinal bore and a lateral connection groove on an upper frontal surface, wherein said at least two oval gears are rotatably mounted within the cavity of the measuring chamber disk, and said oval gears rotate as a function of a minimal pressure differential created across said oval gears by the fluid flowing through said measuring chamber disk; at least two shafts, wherein at least one shaft is disposed within the concentric longitudinal bore of each oval gear to support said oval gear, wherein said shaft has a connection hole adjacent the connection groove of said oval gear; at least one connecting pin for insertion into the connection groove of at least one oval gear and into the connection hole of at least one shaft to affix at least one oval gear to each at least one shaft; a top axial end plate, affixed to the upper surface of the measuring chamber disk for securing the upper end of at least one shaft; a bottom axial end plate, affixed to the bottom surface of the measuring chamber disk for securing the lower end of at least one shaft; and a junction for swivelably coupling at least two oval gears to at least two shafts and providing for automatic alignment of at least two oval gears comprising at least one curved surface being formed at said junction. The small nominal diameter oval gear flowmeter includes the measuring chamber disk and the top axial end plate and the bottom axial end plate which comprises a measuring chamber insert. The measuring chamber insert is constructed from solid carbon/hard-burned carbon. The automatic alignment feature of the present invention facilitates at least two oval gears to swivel about the longitudinal axis of at least two shafts is dependent upon selectively one of the shafts having a curved longitudinal surface and one of the oval gears having a curved longitudinal bore surface and the complimentary shaft surface and longitudinal bore surface is planar. The small nominal diameter oval gear flowmeter wherein the top frontal surfaces and the bottom frontal surfaces of the at least two oval gears have radial recesses adjacent and concentric to the longitudinal bore, wherein said recesses provide a small axial displacement for the two or more oval gears to swivel about the longitudinal shaft axis.

BRIEF DESCRIPTION OF THE DRAWINGS

The invention will be explained in the following with the help of a preferred design example and alternate design examples. The respective drawings show the following.

DETAIL DESCRIPTION OF THE PREFERRED EMBODIMENTS

Figure 1:
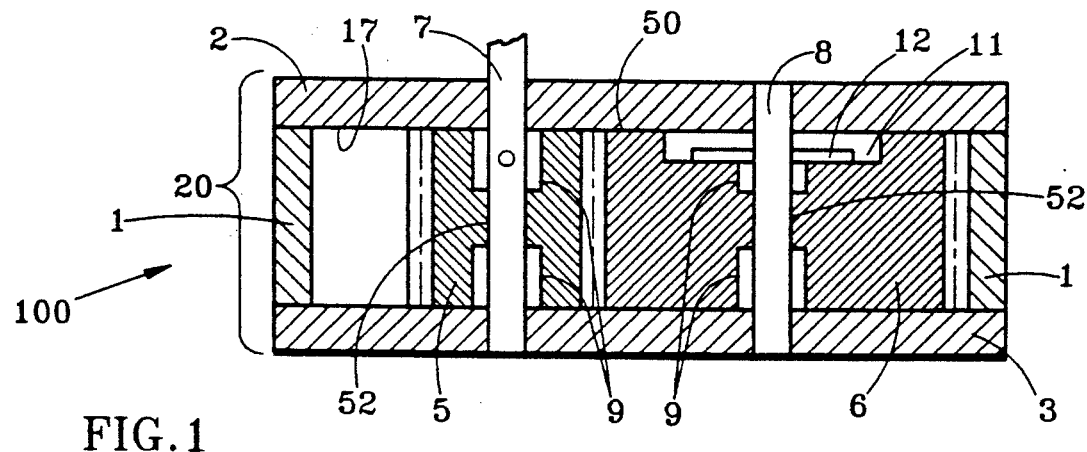
FIG. 1 is a cross-section view of a preferred embodiment of the oval gear measuring chamber encompassed by the present invention.
Figure 2:
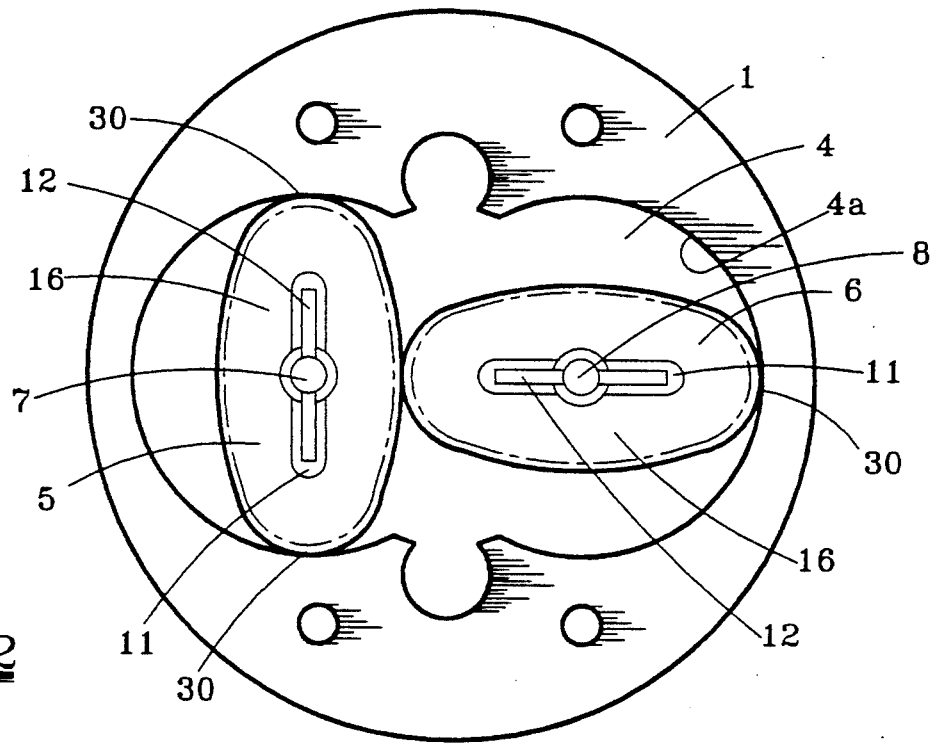
FIG. 2 is a top view of the preferred embodiment of the oval gear measuring chamber illustrated in FIG. 1.

Referring to FIGS. 1 and 2, a small nominal diameter oval gear flowmeter 100 is illustrated emphasizing a measuring chamber 4. The measuring chamber 4 is encompassed by a first axial end plate 2, a second axial end plate 3 and a measuring chamber disk 1, as well as a plurality of oval gears 5, 6. The end plates 2, 3 and the disk 1 comprise the housing 20. The plurality of oval gears 5, 6 are each engaged concentrically to a shaft 7, 8 to permit automatic alignment of the oval gears 5, 6 in the measuring chamber 4. By incorporating the self-aligning oval gear feature, tighter tolerance can be used in designing a plurality of seal gaps 30 between the oval gears 5, 6 and the walls of the housing 20 for improved fluid flow measurement.

As indicated in FIG. 1, the housing 20 comprises the measuring chamber disk 1 and the first axial end plate 2 and the second axial end plate 3. Preferably, two or more oval gears 5, 6 are supported on shafts 7, 8 in measuring chamber 4.

The housing 20 and the oval gears 5, 6 may in a preferred embodiment be constructed of carbon/hard-burned carbon, e.g., EK24 manufactured by the firm of Kinsdorff. Carbon/hard-burned carbon and EK24 material exhibits a low thermal coefficient of expansion and has superb friction properties. Use of the carbon material avoids the formation of appreciable gaps between the oval gears 5, 6, and the measuring chamber walls 4a due to temperature changes of up to 60° K. The oval gear flowmeter 100 of the present invention must be designed to provided for the individual components to heat and cool at different rates. By using small gaps 30 between the oval gears 5, 6 and the measuring chamber walls 4a the accuracy of the measured values is improved. The implementation of small gaps 30 also requires stricter standards regarding a precise parallel rotation of the oval gears 5, 6 in relation to the axial end plates 2, 3. To meet this important requirement, the two oval gears 5, 6 are not supported on commonly used spindles (not shown), but are supported on two or more shafts 7, 8, respectively. The shafts 7, 8 are vertically supported in the first axial end plate 2 and the second axial end plate 3. If the first axial end plate 2 and the second axial end plate 3 are made of hard-burned carbon as described above, separate support bearings (not illustrated) are not required. In accordance with the present invention, it is important that the oval gears 5, 6 are supported on the shafts 7, 8 in such a manner that this allows both a small axial displacement of the oval gears 5, 6 on the shafts 7, 8 as well as a slight swiveling of the oval gears 5, 6 about the longitudinal axis of the shafts 7, 8.

Figure 3:
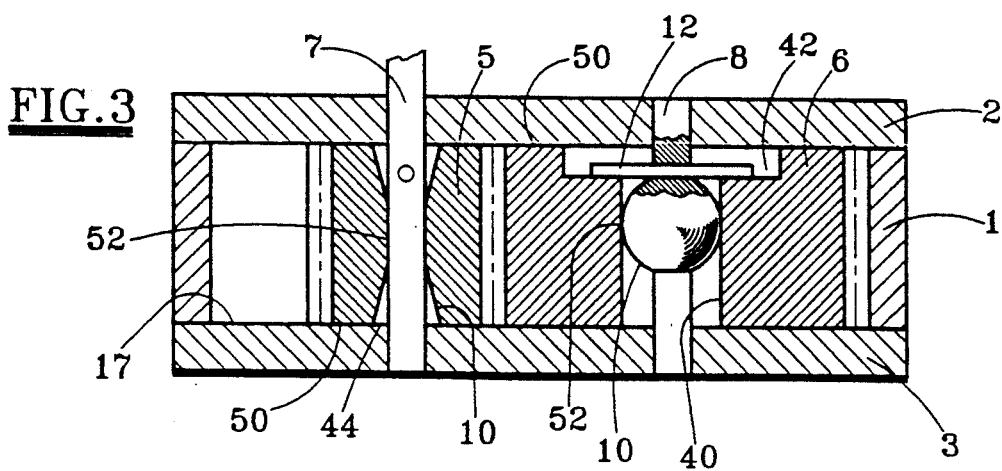
FIG. 3 is a cross-sectional view of the oval gear measuring chamber of the present invention illustrating two alternate embodiments having curved surfaces on the shaft and on the support surface of the oval gears, respectively.

As indicated in FIGS. 1 and 3, a recess 9 is provided on the frontal end surfaces 16 of the oval gears 5, 6. For each oval gear 5, 6 the recesses 9 are peripherally located at a first opening 42 and a second opening 44 of each longitudinal bore 40 disposed through the oval gear 5, 6. The recesses 9 reduce the effective support length of the wall of the longitudinal bore 40 of each oval gear 5, 6, that engages the shaft 7, 8, such that the wall of longitudinal bore 40 which engages the shaft 7, 8 is generally equal to the diameter of the shaft 7, 8. Furthermore, the oval gears 5, 6 are supported on the shafts 7, 8 with a base clearance 50.

FIG. 3 illustrates additional embodiments of the present invention that may be employed to ensure that the oval gears 5, 6 are capable of swiveling in an automatically aligning manner. In an alternate embodiment, the oval gears 5, 6 are supported on the shafts 7, 8, wherein the contact between the oval gears 5, 6 and the shafts 7, 8 are fitted with a curved surface 10. As indicated for shaft 8, depicted in FIG. 3, the curved surface 10 may be applied to shaft 8 which engages the longitudinal bore 40 disposed through the oval gear 6.

As illustrated in FIG. 3 for the oval gear 5, it is also possible to develop the convex or outwardly curved surface 10 of the wall of the longitudinal bore 40 to engage the cylindrically shaped shaft 7. Comparing the preferred embodiment in FIG. 1 and the alternate embodiments in FIG. 3, against an oval gear support system using spindles (not illustrated), which is well known in the art, the oval gears 5, 6 of the present invention provide additional degrees of freedom to rotate. The oval gears 5, 6 engage the shafts 7, 8 at a junction 52 which provides for swivelably coupling the oval gears 5, 6 to the shafts 7, 8. The junction 52 also facilitates the automatic alignment of the oval gears 5, 6, wherein selectively the curved surface of the shaft 8 engages the planar surface of the longitudinal bore 40 of the oval gear 6 or the convex surface of the longitudinal bore 40 of oval gear 5 engages the planar shaft 7. It is thus possible to change the angle in addition to the axial position of the relationship between the oval gears 5, 6 and the shafts 7, 8, while the radial position of the oval gears 5, 6 is maintained accurately by means of a close tolerance between the concentric longitudinal bore 40 of each oval gear 5, 6 and the shaft 7, 8, respectively. Preferably, the frontal surfaces 16 of each oval gear 5, 6 have a parallel relationship, for example by grinding. Also preferably, the axial end plates 2, 3 have a parallel relationship defined by a parallel inside surface 17. The parallel-ground frontal surfaces 16 of the oval gears 5, 6 are aligned automatically on the parallel inside surfaces 17 of the axial end plates 2, 3 to prevent contact between the frontal surfaces 16 and end plates 2, 3 even in the presence of small axial gaps 30 between the frontal surfaces 16 and the end plates 2, 3.

As indicated in FIG. 2, each oval gear 5, 6 has a connection groove 11 in the frontal surface 16 associated with the first opening 42 of the oval gear 5, 6. The connection groove 11 is engaged by a connection pin 12. The connection pin 12 engages the shaft 7, 8 to affix the oval gear 5, 6 with the shaft 7, 8, respectively.

The description of the present invention using the housing 20 does not indicate that the invention covers only this embodiment. The presented description makes it clear to an expert that the invention also applies to the design using other types of housings. The measuring chamber 4 is not restricted to being located only in the measuring chamber disk 1, but can be formed as an integral part of some other housing design or structure.

In the event that the axial end plate 3 and the measuring chamber disk 1 are designed as one solid unit and the shafts 7, 8 are supported in corresponding blind-end holes (not shown), this combination forms a partial housing (not shown). The axial end plate 2 may be replaced by another partial housing (not shown) that may accommodate the inflow and outflow.

What is claimed is:

1. A small nominal diameter self aligning oval gear flowmeter for measuring the volumetric flow of a fluid, comprising:
   a measuring chamber disk having a central cavity defined by a radial wall, wherein fluid flows through said cavity;
   at least two oval gears, each said oval gear having a concentric longitudinal bore for automatic alignment and a lateral connection groove on an upper frontal surface, wherein said at least two oval gears are rotatably mounted within the cavity of the measuring chamber disk, and said oval gears rotate as a function of a minimal pressure differential created across said oval gears by the fluid flowing through said measuring chamber disk;
   at least two shafts, wherein at least one shaft is disposed within the concentric longitudinal bore of each said oval gear to support said oval gear, wherein said shaft has a connection hole adjacent the connection groove of said oval gear;
   at least one connecting pin for insertion into the connection groove of at least one oval gear and into the connection hole of at least one shaft to affix said oval gear to said shaft;
   a top axial end plate, affixed to the upper surface of the measuring chamber disk for securing the upper end of at least one shaft;
   a bottom axial end plate, affixed to the bottom surface of the measuring chamber disk for securing the lower end of at least one shaft; and
   a junction for swivelably coupling said oval gear and said shaft which provides for self alignment of the oval gears.

2. A small nominal diameter self aligning oval gear flowmeter for measuring the volumetric flow of fluids, as defined in claim 1, wherein said junction for swivelably coupling said oval gear to said shaft and providing for automatic alignment of said oval gear, wherein said junction includes at least one curved surface being formed at said junction.

3. The small nominal diameter oval gear flowmeter as defined in claim 1, wherein the measuring chamber disk and the top axial end plate and the bottom axial end plate comprise a measuring chamber insert.

4. The small nominal diameter oval gear flowmeter as defined in claim 3, wherein the oval gears and the measuring chamber insert are constructed from solid carbon/hard-burned carbon.

5. The small nominal diameter oval gear flowmeter as defined in claim 4, wherein the automatic alignment to facilitate at least two oval gears to swivel about the longitudinal axis of at least two shafts is dependent upon selectively one of the shafts having a curved longitudinal surface and one of the oval gears having a curved longitudinal bore surface and the complimentary shaft surface and oval gear longitudinal bore surface is planar.

6. The small nominal diameter oval gear flowmeter as defined in claim 5, wherein the top frontal surfaces and the bottom frontal surfaces of the at least two oval gears have radial recesses adjacent and concentric to the longitudinal bore, wherein said recesses provide a small axial displacement for the two or more oval gears to swivel about the longitudinal shaft axis.

* * * * *